United States Patent
Yoon et al.

(10) Patent No.: US 10,236,125 B2
(45) Date of Patent: Mar. 19, 2019

(54) DIELECTRIC CERAMIC COMPOSITION, MULTILAYER CERAMIC CAPACITOR CONTAINING THE SAME, AND MANUFACTURING METHOD OF MULTILAYER CERAMIC CAPACITOR

(71) Applicant: SAMSUNG ELECTRO-MECHANICS CO., LTD., Suwon-si, Gyeonggi-do (KR)

(72) Inventors: Seok Hyun Yoon, Suwon-si (KR); Jung Deok Park, Suwon-si (KR); Chang Hak Choi, Suwon-si (KR); Dong Hun Kim, Suwon-si (KR); Seung Ho Lee, Suwon-si (KR); Chan Hee Nam, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/478,393

(22) Filed: Apr. 4, 2017

(65) Prior Publication Data

US 2018/0033555 A1 Feb. 1, 2018

(30) Foreign Application Priority Data

Jul. 28, 2016 (KR) .................. 10-2016-0096230

(51) Int. Cl.
*C04B 35/46* (2006.01)
*H01G 4/30* (2006.01)
(Continued)

(52) U.S. Cl.
CPC ........... *H01G 4/30* (2013.01); *C04B 35/4682* (2013.01); *H01G 4/005* (2013.01); *H01G 4/1227* (2013.01);
(Continued)

(58) Field of Classification Search
CPC ...................... C04B 35/468; C04B 35/4682
See application file for complete search history.

(56) References Cited

U.S. PATENT DOCUMENTS

| 5,225,960 A | 7/1993 | Kishi et al. |
| 5,734,545 A | 3/1998 | Sano et al. |

(Continued)

FOREIGN PATENT DOCUMENTS

| JP | 2016-011221 A | 1/2016 |
| KR | 10-1129141 B1 | 3/2012 |

(Continued)

OTHER PUBLICATIONS

Hiroshi Kishi et al., "Base-Metal Electrode-Multilayer Ceramic Capacitors: Past, Present and Future Perspectives", Jpn. J. Appl. Phys. vol. 42 (2003), Part 1, No. 1, pp. 1-15.
(Continued)

*Primary Examiner* — Noah S Wiese
(74) *Attorney, Agent, or Firm* — Morgan Lewis & Bockius LLP (57) ABSTRACT

A dielectric ceramic composition contains: a barium titanate-based powder as a main ingredient; a first accessory ingredient containing Na; a second accessory ingredient containing Ba; and a third accessory ingredient containing Si. A content of the first accessory ingredient (based on moles of Na) is 0.3 to 4.0 moles per 100 moles of the main ingredient, and a Ba/Si ratio is in a range of 0.16 to 1.44.

11 Claims, 4 Drawing Sheets

(51) Int. Cl.
*C04B 35/468* (2006.01)
*H01G 4/005* (2006.01)
*H01G 4/12* (2006.01)

(52) U.S. Cl.
CPC ............ *C04B 2235/3208* (2013.01); *C04B 2235/3215* (2013.01); *C04B 2235/3224* (2013.01); *C04B 2235/3236* (2013.01); *C04B 2235/3239* (2013.01); *C04B 2235/3249* (2013.01); *C04B 2235/3267* (2013.01); *C04B 2235/3418* (2013.01); *C04B 2235/96* (2013.01)

(56) References Cited

U.S. PATENT DOCUMENTS

| | | |
|---|---|---|
| 5,742,473 A | 4/1998 | Sano et al. |
| 5,815,368 A | 9/1998 | Sakamoto et al. |
| 5,818,686 A | 10/1998 | Mizuno et al. |
| 5,862,034 A | 1/1999 | Sato et al. |
| 6,243,254 B1 | 6/2001 | Wada et al. |
| 6,346,497 B1 | 2/2002 | Nakamura et al. |
| 6,380,116 B1 | 4/2002 | Okamatsu et al. |
| 6,485,672 B1 | 11/2002 | Nomura et al. |
| 6,548,437 B2 | 4/2003 | Sato et al. |
| 6,556,422 B2 * | 4/2003 | Kim .................. C04B 35/4682 361/311 |
| 6,613,706 B2 * | 9/2003 | Hagiwara ............... B32B 18/00 361/321.2 |
| 7,273,825 B2 * | 9/2007 | Muto .................. C04B 35/4682 361/321.4 |
| 2005/0219794 A1 * | 10/2005 | Iguchi .................. C04B 35/4682 361/321.2 |
| 2010/0085681 A1 | 4/2010 | Takeda |
| 2011/0069424 A1 | 3/2011 | Shiota et al. |
| 2014/0313634 A1 * | 10/2014 | Yoon .................... H01G 4/1227 361/301.4 |
| 2016/0049248 A1 | 2/2016 | Imura et al. |
| 2016/0163457 A1 | 6/2016 | Yoon et al. |

FOREIGN PATENT DOCUMENTS

| | | |
|---|---|---|
| KR | 10-2014-0125000 A | 10/2014 |
| KR | 10-2016-0069264 A | 6/2016 |
| WO | 2008/155945 A1 | 12/2008 |

OTHER PUBLICATIONS

Office Action issued in corresponding Korean Patent Application No. 10-2016-0096230, dated Aug. 1, 2017, with English Translation.

* cited by examiner

DIELECTRIC CERAMIC COMPOSITION, MULTILAYER CERAMIC CAPACITOR CONTAINING THE SAME, AND MANUFACTURING METHOD OF MULTILAYER CERAMIC CAPACITOR

CROSS-REFERENCE TO RELATED APPLICATION(S)

This application claims the benefit of priority to Korean Patent Application No. 10-2016-0096230 filed on Jul. 28, 2016 in the Korean Intellectual Property Office, the entire disclosure of which is incorporated herein by reference.

BACKGROUND

1. Technical Field

The present disclosure relates to a dielectric ceramic composition, a multilayer ceramic capacitor containing the same, and a method of manufacturing a multilayer ceramic capacitor.

2. Description of Related Art

Generally, ceramic electronic components using a ceramic material, such as a capacitor, an inductor, a piezoelectric element, a varistor, a thermistor, and the like, include a ceramic body formed of the ceramic material, internal electrodes formed in the ceramic body, and external electrodes disposed on surfaces of the ceramic body to be connected to the internal electrodes.

Among ceramic electronic components, a multilayer ceramic capacitor includes a plurality of dielectric layers that are stacked, internal electrodes disposed to face each other with respective dielectric layers interposed therebetween, and external electrodes electrically connected to the internal electrodes.

Multilayer ceramic capacitors have been widely used as components of mobile communications devices such as computers, personal digital assistants (PDA), cellular phones, or the like, due to advantages thereof such as a small size, high capacitance, ease of mounting, and the like.

Recently, as the miniaturization and increases in performance of electronic components such as mobile phones, notebook PCs, and the like, have accelerated, the miniaturization of, and implementation of high capacitance in, multilayer ceramic capacitors used therein have also been continuously required.

In order to achieve these requirements, a technology of thinning dielectric layers of multilayer ceramic capacitors has been continuously developed. Currently, a dielectric layer having a thickness of 1.0 μm or less has been commercialized.

However, when the thickness of the dielectric layer is reduced, various problems such as deteriorations in insulation resistance, reliability, breakdown voltage (BDV), and the like, may occur, such that it has become difficult to further decrease the thickness of dielectric layers.

Therefore, another method, capable of achieving high capacitance of the multilayer ceramic capacitor, is required.

SUMMARY

An aspect of the present disclosure may provide a dielectric ceramic composition satisfying X5R or X7R characteristics specified in the Electronic Industries Association (EIA) standards, which may be sintered at 1100° C. or less under a reduction atmosphere, and a multilayer ceramic capacitor containing the same.

An aspect of the present disclosure may also provide a multilayer ceramic capacitor capable of simultaneously implementing all desired characteristics, that is, a sintering temperature of 1100° C. or less, a dielectric constant of 3500 or more, and high-temperature withstand voltage of 50V/μm or more.

An aspect of the present disclosure may also provide a manufacturing method capable of efficiently producing a multilayer ceramic capacitor satisfying the desired characteristics described above.

According to an aspect of the present disclosure, a dielectric ceramic composition contains: a barium titanate-based powder as a main ingredient; a first accessory ingredient containing sodium (Na); a second accessory ingredient containing barium (Ba); and a third accessory ingredient containing silicon (Si). A content of the first accessory ingredient (based on moles of Na) is 0.3 to 4.0 moles per 100 moles of the main ingredient, and a Ba/Si ratio is in a range of 0.16 to 1.44.

According to another aspect of the present disclosure, a multilayer ceramic capacitor includes: a body in which dielectric layers are stacked; and first and second internal electrodes alternately disposed with respective dielectric layers interposed therebetween. The dielectric layer contains a dielectric ceramic composition, and the dielectric ceramic composition contains: a barium titanate-based powder as a main ingredient; a first accessory ingredient containing Na; a second accessory ingredient containing Ba; and a third accessory ingredient containing Si, a content of the first accessory ingredient (based on moles of Na) being 0.3 to 4.0 moles per 100 moles of the main ingredient, and a Ba/Si ratio in a range of 0.16 to 1.44.

According to another aspect of the present disclosure, a method of manufacturing a multilayer ceramic capacitor may include: preparing ceramic green sheets using a dielectric ceramic composition; printing first and second internal electrodes on the ceramic green sheets, respectively; preparing a body by stacking, compressing, and cutting the ceramic green sheets on which the first and second internal electrodes are printed, respectively; and sintering the body. The dielectric ceramic composition contains: a barium titanate-based powder as a main ingredient; a first accessory ingredient containing Na; a second accessory ingredient containing Ba; and a third accessory ingredient containing Si, a content of the first accessory ingredient (based on moles of Na) being 0.3 to 4.0 moles per 100 moles of the main ingredient, and a Ba/Si ratio in a range of 0.16 to 1.44.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

The present disclosure relates to a dielectric ceramic composition, and an example of an electronic component containing the dielectric ceramic composition may include a capacitor, an inductor, a piezoelectric element, a varistor, a thermistor, or the like. Hereinafter, the dielectric ceramic composition and a multilayer ceramic capacitor as an example of the electronic component will be described.

In the present specification, a content of each accessory ingredient of the dielectric ceramic composition may be indicated as a mole number per 100 moles of a base material powder or at %.

In describing the content of each accessory ingredient in the present specification, at % refers to a percentage value of the number of desired atoms of each accessory ingredient to the number of Ba atoms contained in 1 mole of a main ingredient.

The desired atom may refer to a variable valance acceptor atom, a fixed valence acceptor atom, a rare earth metal atom, and the like.

Dielectric Ceramic Composition

The dielectric ceramic composition according to the exemplary embodiment in the present disclosure may contain a barium titanate-based powder as a main ingredient, a first accessory ingredient containing sodium (Na), a second accessory ingredient containing barium (Ba), and a third accessory ingredient containing silicon (Si), wherein a content of the first accessory ingredient (based on moles of Na) is 0.3 to 4.0 moles per 100 moles of the main ingredient, and a Ba/Si ratio is in a range of 0.16 to 1.44.

The dielectric ceramic composition according to the exemplary embodiment in the present disclosure may satisfy the X5R (−55° C. to 85° C., $\Delta C/C_0 \pm 15\%$) or X7R (−55° C. to 125° C., $\Delta C/C_0 \pm 15\%$) characteristics specified in Electronic Industries Association (EIA) standards.

Further, a multilayer ceramic capacitor using the dielectric ceramic composition may simultaneously implement all the desired characteristics, that is, a sintering temperature of 1100° C. or less, a dielectric constant of 3500 or more, and a high-temperature withstand voltage of 50V/μm or more.

Hereinafter, each ingredient of the dielectric ceramic composition according to the exemplary embodiment in the present disclosure will be described in detail.

a) Main Ingredient (Base Material Powder)

The barium titanate-based powder may be a powder formed of one or more selected from the group consisting of $BaTiO_3$, $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x≤0.3, 0≤y≤0.5), and $Ba(Ti_{1-y}Zr_y)O_3$ (0≤y≤0.5).

A particle size of a starting material of the main ingredient may be preferably 1.0 μm or less.

An effect of increasing a dielectric constant by the method disclosed in the present specification may be equally applied to a solid solution base material modified from $BaTiO_3$ as in base material such as $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x≤0.3, 0≤y≤0.5), $Ba(Ti_{1-y}Zr_y)O_3$ (0<y≤0.5), and the like, in which Ca, Zr, or the like, is partially solid-dissolved in BT as well as a pure $BaTiO_3$ (BT) base material.

b) First Accessory Ingredient

The dielectric ceramic composition according to the exemplary embodiment in the present disclosure may contain a first accessory ingredient containing Na.

For example, the first accessory ingredient may be $Na_2O$ or $Na_2CO_3$.

A content of the first accessory ingredient (based on the Na element) may be within a range of 0.3 to 4.0 moles per 100 moles of the main ingredient.

Alternatively, the first accessory ingredient may be contained so that a content of Na is within a range of 0.3 to 4.0 at %.

The first accessory ingredient may serve to decrease a sintering temperature of a multilayer ceramic capacitor using the dielectric ceramic composition, and improve high-temperature withstand voltage characteristics.

When the content of Na in the first accessory ingredient is less than 0.3 at %, a suitable sintering temperature may be 1130° C., such that it may be impossible to decrease the sintering temperature to 1100° C. or less. Further, in the case in which the content of Na in the first accessory ingredient is more than 4.0 at %, high-temperature withstand voltage characteristics may be deteriorated.

That is, since the dielectric ceramic composition according to the present exemplary embodiment contains the first accessory ingredient containing Na so that the content of Na is within a range of 0.3 to 4.0 at %, the dielectric ceramic composition may simultaneously implement multiple desired characteristics, that is, a sintering temperature of 1100° C. or less, a dielectric constant of 3500 or more, and a high-temperature withstand voltage of 50V/μm or more. Here, in a dielectric layer of a multilayer ceramic capacitor manufactured using the dielectric ceramic composition as described above, the average number of domain walls per crystal grain may be 5 or more.

c) Second Accessory Ingredient

According to an exemplary embodiment in the present disclosure, the dielectric ceramic composition may contain a second accessory ingredient containing one or more selected from the group consisting of oxides and carbonates of Ba. For example, the second accessory ingredient may be BaO or $BaCO_3$.

The second accessory ingredient may be contained in a content within a range of 0.2 to 1.8 moles per 100 moles of the main ingredient.

When the second accessory ingredient is not added or is contained in an excessive amount, the dielectric constant may be decreased to be less than 3500.

That is, since the dielectric ceramic composition according to the exemplary embodiment in the present disclosure contains the second accessory ingredient containing Ba in a content within a range of 0.2 to 1.8 moles per 100 moles of the base material powder, the dielectric ceramic composition may have an effect of simultaneously implementing multiple desired characteristics, that is, a sintering temperature of 1100° C. or less, a dielectric constant of 3500 or more, and a high-temperature withstand voltage of 50V/µm or more.

Here, in a dielectric layer of a multilayer ceramic capacitor manufactured using the dielectric ceramic composition as described above, the average number of domain walls per crystal grain may be 5 or more.

d) Third Accessory Ingredient

According to an exemplary embodiment in the present disclosure, the dielectric ceramic composition may contain a third accessory ingredient containing one or more selected from the group consisting of oxides and carbonates of Si, and glass containing Si. For example, the third accessory ingredient may be $SiO_2$.

The third accessory ingredient may be contained in a content within a range of 0.5 to 4.0 moles per 100 moles of the main ingredient. Alternatively, a content of the third accessory ingredient (based on the Si element) may be within a range of 0.5 to 4.0 at %.

When the content of the third accessory ingredient is less than 0.4 moles per 100 moles of a dielectric base material powder, the sintering temperature may be higher than 1100° C., and when the content of the third accessory ingredient is more than 4.0 moles, high-temperature withstand voltage characteristics may be deteriorated.

That is, since the dielectric ceramic composition according to the exemplary embodiment in the present disclosure contains the third accessory ingredient containing Si in a content within a range of 0.4 to 4.0 moles per 100 moles of the base material powder, the dielectric ceramic composition may simultaneously implement multiple desired characteristics, that is, a sintering temperature of 1100° C. or less, a dielectric constant of 3500 or more, and a high-temperature withstand voltage of 50V/µm or more.

Here, in a dielectric layer of a multilayer ceramic capacitor manufactured using the dielectric ceramic composition as described above, the average number of domain walls per crystal grain may be 5 or more.

e) Fourth Accessory Ingredient

According to an exemplary embodiment of the present disclosure, the dielectric ceramic composition may contain an oxide or carbonate containing at least one of yttrium (Y), dysprosium (Dy), holmium (Ho), lanthanum (La), cerium (Ce), neodymium (Nd), samarium (Sm), gadolinium (Gd), or erbium (Er) as a fourth accessory ingredient. For example, the fourth accessory ingredient may be $Dy_2O_3$.

A content of the fourth accessory ingredient may be within a range of 0.15 to 1.50 moles per 100 moles of the base material powder.

According to the present exemplary embodiment, the fourth accessory ingredient may serve to prevent reliability of the multilayer ceramic capacitor to which the dielectric ceramic composition is applied from being deteriorated, and in a case in which the fourth accessory ingredient is contained in a content within a range of 0.15 to 1.5 moles per 100 moles of the base material powder, a dielectric ceramic composition capable of implementing a high dielectric constant and having excellent high-temperature withstand voltage characteristics may be provided.

When the content of the fourth accessory ingredient is excessively low or high, in a dielectric layer of a multilayer ceramic capacitor manufactured using the dielectric ceramic composition as described above, the average number of domain walls per crystal grain may be less than 5.

f) Fifth Accessory Ingredient

According to the exemplary embodiment in the present disclosure, the dielectric ceramic composition may further contain an oxide or carbonate containing at least one of manganese (Mn), vanadium (V), chromium (Cr), iron (Fe), nickel (Ni), cobalt (Co), copper (Cu), and zinc (Zn) as a fifth accessory ingredient. For example, the fifth accessory ingredient may be $MnO_2$ or $V_2O_5$.

Manganese (Mn), vanadium (V), chromium (Cr), iron (Fe), nickel (Ni), cobalt (Co), copper (Cu), and zinc (Zn) are variable valence acceptor elements.

The fifth accessory ingredient may be contained in a content within a range of 0.075 to 1.5 moles per 100 moles of the base material powder. Alternatively, the fifth accessory ingredient may be contained so that a sum of contents of the variable valence acceptor elements contained in the fifth accessory ingredient is within a range of 0.1 to 2.0 at %.

The fifth accessory ingredient may serve to increase the dielectric constant of the multilayer ceramic capacitor to which the dielectric ceramic composition is applied, and improve high-temperature withstand voltage characteristics of the multilayer ceramic capacitor.

When the content of the fifth accessory ingredient is less than 0.075 moles per 100 moles of the main ingredient, high-temperature withstand voltage characteristics may be deteriorated, and when the content of the fifth accessory ingredient is more than 1.5 moles per 100 moles of the base material powder, the dielectric constant may be decreased to be less than 3500.

Alternatively, in a case in which the sum of the contents of the variable valence acceptor elements contained in the fifth accessory ingredient is less than 0.1 at %, high-temperature withstand voltage characteristics may be deteriorated, and in a case in which the sum is more than 2.0 at %, the dielectric constant may be decreased to be less than 3500.

g) Sixth Accessory Ingredient

The dielectric ceramic composition according to an exemplary embodiment in the present disclosure may further contain an oxide or carbonate of Ca or Zn as a sixth accessory ingredient. For example, the sixth accessory ingredient may be CaO, $ZrO_2$, $CaCO_3$, or $Zr(CO_3)_2$.

A content of the sixth accessory ingredient may be greater than 0 to 10 moles or less per 100 moles of the main ingredient.

When the sixth accessory ingredient is added, an RC value may be increased, but when the content of the sixth accessory ingredient is an excessive amount, the dielectric constant may be decreased.

That is, since the dielectric ceramic composition according to the present exemplary embodiment further contains the oxide or carbonate of Ca or Zr as the sixth accessory ingredient in a content within a range of greater than 0 mole to 10 moles per 100 moles of the main ingredient, the dielectric ceramic composition may simultaneously implement multiple desired characteristics, that is, a sintering temperature of 1100° C. or less, dielectric constant of 3500 or more, and high-temperature withstand voltage of 50V/µm or more.

Multilayer Ceramic Capacitor

Figure 1:
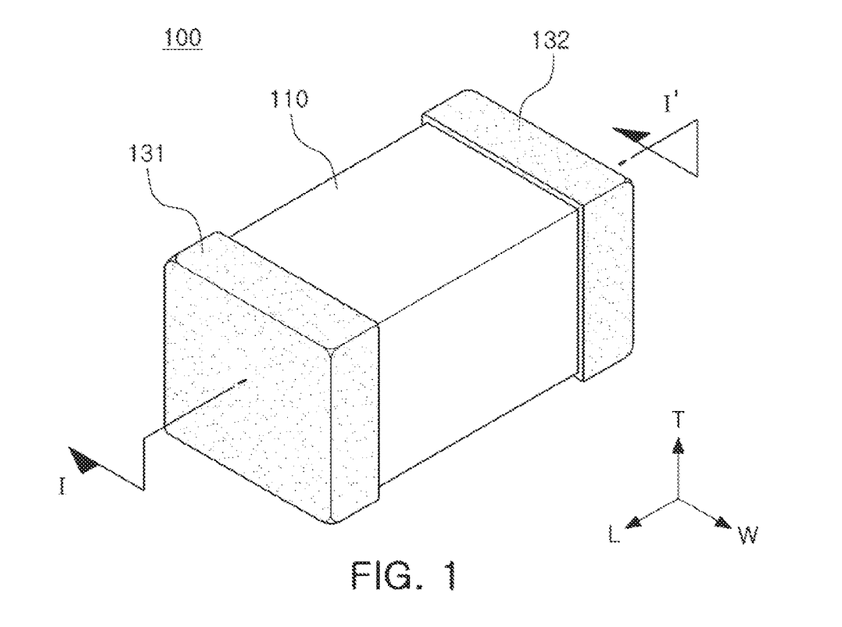
FIG. 1 is a schematic perspective view illustrating a multilayer ceramic capacitor according to an exemplary embodiment in the present disclosure.
Figure 2:
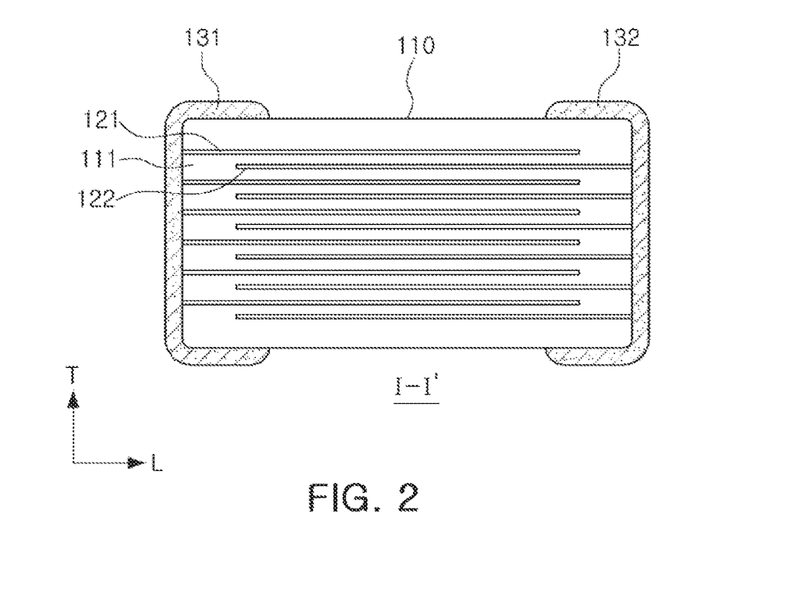
FIG. 2 is a schematic cross-sectional view taken along line I-I' of FIG. 1.

FIG. 1 is a schematic perspective view illustrating a multilayer ceramic capacitor according to another exemplary embodiment in the present disclosure, and FIG. 2 is a schematic cross-sectional view taken along line I-I' of FIG. 1.

Referring to FIGS. 1 and 2, the multilayer ceramic capacitor 100 according to the present exemplary embodiment in the present disclosure may include a ceramic body 110 in which dielectric layers 111 and first and second internal electrodes 121 and 122 are alternately stacked. First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but generally, may be hexahedral. In addition, dimensions of the ceramic body 110 are not particularly limited, and the ceramic body may have a suitable dimension depending on the use. For example, the ceramic body may have dimensions of (0.6~5.6 mm)×(0.3~5.0 mm)×(0.3~1.9 mm).

A thickness of the dielectric layer 111 may optionally be changed, depending on a capacitance design of the capacitor. According to the exemplary embodiment in the present disclosure, a thickness of a single dielectric layer after sintering may be 0.1 µm or more.

In a case in which the dielectric layer has an excessively thin thickness, the number of crystal grains existing in the single dielectric layer is small, which has a negative influence on reliability. Therefore, the thickness of the dielectric layer may be 0.1 µm or more.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on both end portions of the ceramic body 110 and electrically connected to the exposed end surfaces of the first and second internal electrodes 121 and 122 that are alternately disposed, thereby configuring a capacitor circuit.

A conductive material contained in the first and second internal electrodes 121 and 122 is not particularly limited, but the dielectric layers 111 according to the exemplary embodiment in the present disclosure may be formed using the dielectric ceramic composition according to the exemplary embodiment in the present disclosure.

A thickness of the first and second internal electrodes 121 and 122 may be appropriately determined depending on the use, or the like, thereof, but is not particularly limited. For example, the thickness may be within a range of 0.1 to 5 µm or within a range of 0.1 to 2.5 µm.

A conductive material contained in the first and second external electrodes 131 and 132 is not particularly limited, and nickel (Ni), copper (Cu), or an alloy thereof may be used.

A thickness of the first and second external electrodes 131 and 132 may be appropriately determined depending on the use, or the like, but is not particularly limited. For example, the thickness may be within a range of 10 to 50 µm.

Hereinafter, the present disclosure will be described in detail through Inventive Examples and Comparative Examples, but these are to help the specific understanding of the present disclosure. Therefore, the scope of the present disclosure is not limited to the Inventive Examples.

Raw material powder particles containing a main ingredient and accessory ingredients so as to have compositions illustrated in the following Tables 1, 3, 5, and 7, respectively, were mixed with a dispersant, and a binder, ethanol, and toluene using zirconia balls as mixing/dispersing media and then ball-milled for 20 hours.

As the main ingredient, a $BaTiO_3$ powder having an average particle size of 100 nm was used.

Ceramic sheets having a thickness of 3.0 µm and a thickness of 10 µm to 13 µm were manufactured using the prepared slurry and a coater in a doctor blade scheme.

A nickel (Ni) internal electrode was printed on the ceramic sheets.

Upper and lower covers were manufactured by stacking and compressing 25 sheets (thickness: 10 µm to 13 µm) for a cover, respectively.

20 active sheets on which the internal electrode was printed were stacked and compressed, thereby manufacturing a compressed bar.

Then, the compressed bar was cut into 3216-sized chips (3.2 mm×1.6 mm) using a cutter. After the manufactured 3216-sized multilayer ceramic capacitor (MLCC) chip was calcined and sintered at 1080 to 1130° C. for 2 hours under a reduction atmosphere (0.1% $H_2$/99.9% $N_2$, $H_2O/H_2/N_2$ atmosphere), a re-oxidation heat-treatment was performed on the sintered chip at 1000° C. for 3 hours under a nitrogen ($N_2$) atmosphere.

External electrodes were completed by terminating the sintered chips using a copper (Cu) paste and sintering the formed electrodes. Therefore, a MLCC chip in which a crystal grain size was 150 nm after sintering, a thickness of the dielectric layer was about 2.0 µm, the number of dielectric layers was 20, and of which a size was 3.2 mm×1.6 mm was manufactured.

Room-temperature capacitances and dissipation factors of prototype multilayer ceramic capacitor (MLCC) samples completed as described above were measured at 1 kHz and AC voltage of 0.5V/µm using a LCR-meter.

A dielectric constant of the multilayer ceramic capacitor (MLCC) was calculated from the capacitance, a thickness of a dielectric layer of the multilayer ceramic capacitor (MLCC), an area of the internal electrodes, and the number of stacked dielectric layers of the multilayer ceramic capacitor (MLCC).

Room temperature insulation resistance (IR) was measured after 60 seconds in a state in which ten samples were taken and a DC voltage of 10V/µm was applied thereto.

The temperature coefficient of capacitance (TCC) depending on a temperature was measured in a temperature range from −55 to 145° C.

In a high temperature withstand voltage step-up experiment IR, a resistance degradation behavior was measured while increasing the voltage step by 10V/µm at 150° C. and a resistance value was measured every 5 seconds, wherein the time of each step was 10 minutes.

The high-temperature withstand voltage was derived from the high temperature withstand voltage step-up experiment IR. Here, the high-temperature withstand voltage means a voltage at which an IR may withstand $10^5 \Omega$ or more when the high-temperature withstand voltage was measured by applying the step voltage of DC 5 V/µm to a 3216-sized chip at 150° C. for 10 minutes and continuously increasing the step voltage, wherein the 3216-sized chip has 20 dielectric layers having a thickness of 2 µm after sintering.

The RC value is a product of a room-temperature capacitance value measured at AC 0.5V/µm and 1 kHz and an insulation resistance value measured at DC 10V/µm.

Tables 2, 4, 6, and 8 illustrate characteristics of prototype multilayer ceramic capacitors (MLCCs) corresponding to the compositions illustrated in Tables 1, 3, 5, and 7, respectively.

TABLE 1

Content (mole) of Each Additive per 100 Moles of Main Ingredient BaTiO$_3$

| Sample | 1st Accessory Ingredient Na$_2$CO$_3$ | 2nd Accessory Ingredient BaCO$_2$ | 3rd Accessory Ingredient SiO$_2$ | 4th Accessory Ingredient Dy$_2$O$_3$ | 5th Accessory Ingredient MnO$_2$ | 6th Accessory Ingredient V$_2$O$_5$ | Ca | Zr | Ba/Si Ratio |
|---|---|---|---|---|---|---|---|---|---|
| 1-1  | 0.00 | 0.00 | 1.25 | 0.30 | 0.200 | 0.100 | 1.00 | 1.00 | 0.00 |
| 1-2  | 0.00 | 0.20 | 1.25 | 0.30 | 0.200 | 0.100 | 1.00 | 1.00 | 0.16 |
| 1-3  | 0.00 | 0.60 | 1.25 | 0.30 | 0.200 | 0.100 | 1.00 | 1.00 | 0.48 |
| 1-4  | 0.00 | 1.00 | 1.25 | 0.30 | 0.200 | 0.100 | 1.00 | 1.00 | 0.80 |
| 1-5  | 0.00 | 1.40 | 1.25 | 0.30 | 0.200 | 0.100 | 1.00 | 1.00 | 1.12 |
| 1-6  | 0.00 | 1.80 | 1.25 | 0.30 | 0.200 | 0.100 | 1.00 | 1.00 | 1.44 |
| 1-7  | 0.00 | 2.00 | 1.25 | 0.30 | 0200  | 0.100 | 1.00 | 1.00 | 1.60 |
| 1-8  | 0.15 | 0.00 | 1.25 | 0.30 | 0.200 | 0.100 | 1.00 | 1.00 | 0.00 |
| 1-9  | 0.15 | 0.20 | 1.25 | 0.30 | 0.200 | 0.100 | 1.00 | 1.00 | 0.16 |
| 1-10 | 0.15 | 0.60 | 1.25 | 0.30 | 0.200 | 0.100 | 1.00 | 1.00 | 0.48 |
| 1-11 | 0.15 | 1.00 | 1.25 | 0.30 | 0.200 | 0.100 | 1.00 | 1.00 | 0.80 |
| 1-12 | 0.15 | 1.40 | 1.25 | 0.30 | 0.200 | 0.100 | 1.00 | 1.00 | 1.12 |
| 1-13 | 0.15 | 1.80 | 1.25 | 0.30 | 0.200 | 0.100 | 1.00 | 1.00 | 1.44 |
| 1-14 | 0.15 | 2.00 | 1.25 | 0.30 | 0.200 | 0.100 | 1.00 | 1.00 | 1.60 |
| 1-15 | 0.50 | 0.00 | 1.25 | 0.30 | 0.200 | 0.100 | 1.00 | 1.00 | 0.00 |
| 1-16 | 0.50 | 0.20 | 1.25 | 0.30 | 0.200 | 0.100 | 1.00 | 1.00 | 0.16 |
| 1-17 | 0.50 | 0.60 | 1.25 | 0.30 | 0200  | 0.100 | 1.00 | 1.00 | 0.48 |
| 1-18 | 0.50 | 1.00 | 125  | 0.30 | 0.200 | 0.100 | 1.00 | 1.00 | 0.80 |
| 1-19 | 0.50 | 1.40 | 1.25 | 0.30 | 0,200 | 0.100 | 1.00 | 1.00 | 1.12 |
| 1-20 | 0.50 | 1.80 | 1.25 | 0.30 | 0.200 | 0.100 | 1.00 | 1.00 | 1.44 |
| 1-21 | 0.50 | 2.00 | 1.25 | 0.30 | 0.200 | 0.100 | 1.00 | 1.00 | 1.60 |
| 1-22 | 2.00 | 0.00 | 1.25 | 0.30 | 0.200 | 0.100 | 1.00 | 1.00 | 0.00 |
| 1-23 | 2.00 | 0.20 | 1.25 | 0.30 | 0200  | 0.100 | 1.00 | 1.00 | 0.16 |
| 1-24 | 2.00 | 0.60 | 1.25 | 0.30 | 0.200 | 0.100 | 1.00 | 1.00 | 0.48 |
| 1-25 | 2.00 | 1.00 | 1.25 | 0.30 | 0.200 | 0.100 | 1.00 | 1.00 | 0.80 |
| 1-26 | 2.00 | 1.40 | 1.25 | 0.30 | 0.200 | 0.100 | 1.00 | 1.00 | 1.12 |
| 1-27 | 2.00 | 1.80 | 1.25 | 0.30 | 0.200 | 0.100 | 1.00 | 1.00 | 1.44 |
| 1-28 | 2.00 | 2.00 | 1.25 | 0.30 | 0.200 | 0.100 | 1.00 | 1.00 | 1.60 |
| 1-29 | 3.00 | 0.00 | 1.25 | 0.30 | 0200  | 0.100 | 1.00 | 1.00 | 0.00 |
| 1-30 | 3.00 | 0.20 | 1.25 | 0.30 | 0.200 | 0.100 | 1.00 | 1.00 | 0.16 |
| 1-31 | 3.00 | 0.60 | 1.25 | 0.30 | 0.200 | 0.100 | 1.00 | 1.00 | 0.48 |
| 1-32 | 3.00 | 1.00 | 1.25 | 0.30 | 0.200 | 0.100 | 1.00 | 1.00 | 0.80 |
| 1-33 | 3.00 | 1.40 | 1.25 | 0.30 | 0.200 | 0.100 | 1.00 | 1.00 | 1.12 |
| 1-34 | 3.00 | 1.80 | 1.25 | 0.30 | 0.200 | 0.100 | 1.00 | 1.00 | 1.44 |
| 1-35 | 3.00 | 2.00 | 1.25 | 0.30 | 0200  | 0.100 | 1.00 | 1.00 | 1.60 |

TABLE 2

| | Characteristics of Proto-type MLCC | | | | | Judgment of Characteristics | | |
|---|---|---|---|---|---|---|---|---|
| Sample | Dielectric Constant | DF(%) | RC(ΩF) | TCC(%) (85° C.) | High-Temperature Withstand Voltage (V/μm)* | Sintering Temperature (° C.) | Dielectric Consent ○: Good X: Poor | High-Temperature Withstand Voltage ○: Good X: Poor | Sintering Property ○: Good X: Poor |
| 1-1  | 3205 | 5.47 | 3005 | −10.2% | 60 | 1130 | X | ○ | X |
| 1-2  | 3628 | 6.12 | 3456 | −10.4% | 55 | 1130 | ○ | ○ | X |
| 1-3  | 4189 | 5.88 | 3258 | −10.1% | 55 | 1130 | ○ | ○ | X |
| 1-4  | 4464 | 5.78 | 3125 | −10.5% | 55 | 1130 | ○ | ○ | X |
| 1-5  | 4084 | 5.63 | 2874 | −10.6% | 55 | 1130 | ○ | ○ | X |
| 1-6  | 3652 | 5.02 | 2789 | −10.2% | 50 | 1130 | ○ | ○ | X |
| 1-7  | 3151 | 4.68 | 3006 | −9.4%  | 50 | 1130 | X | ○ | X |
| 1-8  | 3133 | 4.55 | 3124 | −8.5%  | 60 | 1100 | X | ○ | ○ |
| 1-9  | 3500 | 5.47 | 3007 | −7.8%  | 60 | 1100 | ○ | ○ | ○ |
| 1-10 | 4612 | 6.61 | 3287 | −8.4%  | 65 | 1100 | ○ | ○ | ○ |
| 1-11 | 4111 | 6.58 | 2955 | −7.7%  | 60 | 1100 | ○ | ○ | ○ |
| 1-12 | 3774 | 6.00 | 3250 | −6.8%  | 65 | 1100 | ○ | ○ | ○ |
| 1-13 | 3585 | 5.87 | 3117 | −6.4%  | 60 | 1100 | ○ | ○ | ○ |
| 1-14 | 2922 | 5.77 | 2963 | −6.1%  | 60 | 1100 | X | ○ | ○ |
| 1-15 | 3306 | 5.64 | 3125 | −8.1%  | 60 | 1090 | X | ○ | ○ |
| 1-16 | 3955 | 5.90 | 3364 | −8.2%  | 60 | 1090 | ○ | ○ | ○ |
| 1-17 | 4342 | 6.42 | 3458 | −8.8%  | 65 | 1090 | ○ | ○ | ○ |
| 1-18 | 4505 | 6.50 | 3697 | −6.5%  | 65 | 1090 | ○ | ○ | ○ |
| 1-19 | 4312 | 6.42 | 3285 | −7.7%  | 65 | 1090 | ○ | ○ | ○ |
| 1-20 | 3725 | 5.84 | 2947 | −8.4%  | 60 | 1090 | ○ | ○ | ○ |
| 1-21 | 3464 | 5.69 | 3145 | −8.7%  | 55 | 1090 | X | ○ | ○ |

TABLE 2-continued

| | Characteristics of Proto-type MLCC | | | | | Judgment of Characteristics | | |
|---|---|---|---|---|---|---|---|---|
| Sample | Dielectric Constant | DF(%) | RC(ΩF) | TCC(%) (85° C.) | High-Temperature Withstand Voltage (V/μm)* | Sintering Temperature (° C.) | Dielectric Consent ○: Good X: Poor | High-Temperature Withstand Voltage ○: Good X: Poor | Sintering Property ○: Good X: Poor |
| 1-22 | 3450 | 6.07 | 3325 | −9.3% | 55 | 1090 | X | ○ | ○ |
| 1-23 | 4185 | 6.12 | 3126 | −9.4% | 65 | 1090 | ○ | ○ | ○ |
| 1-24 | 4724 | 6.67 | 3478 | −9.0% | 60 | 1090 | ○ | ○ | ○ |
| 1-25 | 4465 | 6.54 | 2986 | −9.7% | 60 | 1090 | ○ | ○ | ○ |
| 1-26 | 4002 | 6.38 | 3478 | −9.4% | 60 | 1090 | ○ | ○ | ○ |
| 1-27 | 3629 | 5.98 | 2988 | −9.6% | 55 | 1090 | ○ | ○ | ○ |
| 1-28 | 3468 | 5.64 | 3325 | −8.7% | 55 | 1090 | X | ○ | ○ |
| 1-29 | 3231 | 5.58 | 3125 | −9.5% | 45 | 1080 | X | X | ○ |
| 1-30 | 4145 | 6.48 | 2954 | −9.6% | 45 | 1080 | ○ | X | ○ |
| 1-31 | 4354 | 6.15 | 3425 | −9.4% | 45 | 1080 | ○ | X | ○ |
| 1-32 | 3525 | 5.98 | 3647 | −9.2% | 40 | 1080 | ○ | X | ○ |
| 1-33 | 3375 | 5.64 | 3105 | −8.7% | 40 | 1080 | X | X | ○ |
| 1-34 | 3063 | 5.23 | 2849 | −9.8% | 40 | 1080 | X | X | ○ |
| 1-35 | 2854 | 5.21 | 2557 | −9.3% | 40 | 1080 | X | X | ○ |

Samples 1-1 to 1-35 of Table 1 illustrate Inventive Examples depending on changes in contents of a first accessory ingredient $Na_2CO_3$ and a second accessory ingredient $BaCO_3$ and a change in a Ba/Si ratio, when a content of a third accessory ingredient $SiO_2$ was 1.25 moles, a content of a fourth accessory ingredient $Dy_2O_3$ was 0.3 moles, contents of fifth accessory ingredients $MnO_2$ and $V_2O_5$ were 0.2 moles and 0.1 moles, respectively, and contents of sixth accessory ingredients $CaCO_3$ and $ZrO_2$ were 1.0 mole and 1.0 mole respectively, per 100 moles of the main ingredient $BaTiO_3$.

Samples 1-1 to 1-35 of Table 2 illustrate characteristics of prototype multilayer ceramic capacitors using Ni internal electrodes corresponding to samples 1-1 to 1-35 of Table 1, respectively, and sintered under the reduction atmosphere.

In all of the cases (samples 1-1 to 1-7) in which $Na_2CO_3$ was not added, a suitable sintering temperature was about 1130° C. Hence, a sintering temperature of 1100° C. or less, the desired sintering temperature in the present disclosure, was not satisfied.

In samples 1-8 to 1-14 in which the content of $Na_2CO_3$ was 0.15 moles per 100 moles of the main ingredient, sintering may be performed at 1100° C., and in cases (samples 1-9 to 1-13) in which the content of the second accessory ingredient was 0.2 to 1.8 moles per 100 moles of the main ingredient, the Ba/Si ratio was in a range of 0.16 to 1.44. In this case, all the desired characteristics, that is, a sintering temperature of 1100° C. or less, a dielectric constant of 3500 or more, and a high-temperature withstand voltage of 50V/μm or more may be simultaneously implemented.

However, in a case (sample 1-8) in which the content of Ba was excessively low or a case (sample 1-14) in which the content of Ba was excessively high, the Ba/Si ratio was outside of the range of 0.16 to 1.44, and the dielectric constant was decreased to be less than 3500.

In samples 1-15 to 1-21 in which the content of $Na_2CO_3$ was 0.5 moles per 100 moles of the main ingredient, sintering may be performed at 1100° C. or less, and in cases (samples 1-16 to 1-20) in which the content of Ba was 0.2 to 1.8 moles per 100 moles of the main ingredient, the Ba/Si ratio was in a range of 0.16 to 1.44. In these cases, multiple desired characteristics, that is, a sintering temperature of 1100° C. or less, a dielectric constant of 3500 or more, and a high-temperature withstand voltage of 50V/μm or more may be simultaneously implemented. In a case (sample 1-15) in which the content of Ba was excessively low or a case (sample 1-21) in which the content of Ba was excessively high, the dielectric constant was decreased to be less than 3500.

In samples 1-22 to 1-28 in which the content of $Na_2CO_3$ was 2.0 moles per 100 moles of the main ingredient, the same behavior may be confirmed. That is, in cases (samples 1-23 to 1-27) in which the content of Ba was 0.2 to 1.8 moles per 100 moles of the main ingredient, the Ba/Si ratio was in a range of 0.16 to 1.44. In these cases, all the desired characteristics, that is, a sintering temperature of 1100° C. or less, a dielectric constant of 3500 or more, and a high-temperature withstand voltage of 50V/μm or more may be simultaneously implemented.

In all of samples 1-29 to 1-35 in which the content of $Na_2CO_3$ was 3.0 moles per 100 moles of the main ingredient, it may be confirmed that the high-temperature withstand voltage was less than 50V/μm.

Therefore, when the content of the third accessory ingredient $SiO_2$ was 1.25 moles, the content of the fourth accessory ingredient $Dy_2O_3$ was 0.3 moles, the contents of the fifth accessory ingredients $MnO_2$ and $V_2O_5$ were 0.2 moles and 0.1 moles, respectively, and the contents of sixth accessory ingredients $CaCO_3$ and $ZrO_2$ were 1.0 mole and 1.0 mole respectively, per 100 moles of the main ingredient $BaTiO_3$, in a case in which the content of Na was 0.3 to 4.0 at % (based on at %), and the Ba/Si ratio was in a range of 0.16 to 1.44, multiple desired characteristics, that is, a dielectric constant of 3500 or more, a sintering temperature of 1100° C. or less, and a high-temperature withstand voltage of 50V/μm or more may be simultaneously implemented.

Therefore, when the content of the third accessory ingredient $SiO_2$ was 1.25 moles, the content of the fourth accessory ingredient $Dy_2O_3$ was 0.3 moles, the contents of the fifth accessory ingredients $MnO_2$ and $V_2O_5$ were 0.2 moles and 0.1 moles, respectively, and the contents of sixth accessory ingredients $CaCO_3$ and $ZrO_2$ were 1.0 mole and 1.0 mole respectively, per 100 moles of the main ingredient $BaTiO_3$, in a case in which the content of Na was 0.3 to 4.0 at % (based on at %), and the Ba/Si ratio was in a range of 0.16 to 1.44, a fine structure in which the average number of domain walls per crystal grain of the dielectric layer was 5 or more was formed as described below, and at the same time, multiple desired characteristics, that is, a dielectric constant of 3500 or more, a sintering temperature of 1100° C. or less, and a high-temperature withstand voltage of 50V/μm or more may be simultaneously implemented.

in the multilayer ceramic capacitor according to the exemplary embodiment in the present disclosure was less than 0.2 moles or more than 1.80 moles per 100 moles of the main ingredient, the dielectric constant was decreased to be less than 3500.

When the multilayer ceramic capacitor according to the exemplary embodiment in the present disclosure contains the second accessory ingredient containing Ba in a content

TABLE 3

Content (mole) of Each Additive per 100 Moles of Main Ingredient BaTiO₃

| Sample | 1st Accessory ingredient Na₂CO₃ | 2nd Accessory ingredient BaCO₃ | 3rd Accessory ingredient SiO₂ | 4th Accessory ingredient Dy₂O₃ | 5th Accessory ingredient MnO₂ | 5th Accessory ingredient V₂O₅ | 6th Accessory ingredient Ca | 6th Accessory ingredient Zr | Ba/Si Ratio |
|---|---|---|---|---|---|---|---|---|---|
| 3-1  | 0.50 | 0.00 | 1.25 | 0.30 | 0.200 | 0.100 | 1.00 | 1.00 | 0.00 |
| 3-2  | 0.50 | 0.20 | 1.25 | 0.30 | 0.200 | 0.100 | 1.00 | 1.00 | 0.16 |
| 3-3  | 0.50 | 0.60 | 1.25 | 0.30 | 0.200 | 0.100 | 1.00 | 1.00 | 0.48 |
| 3-4  | 0.50 | 1.00 | 1.25 | 0.30 | 0.200 | 0.100 | 1.00 | 1.00 | 0.80 |
| 3-5  | 0.50 | 1.40 | 1.25 | 0.30 | 0.200 | 0.100 | 1.00 | 1.00 | 1.12 |
| 3-6  | 0.50 | 1.80 | 1.25 | 0.30 | 0.200 | 0.100 | 1.00 | 1.00 | 1.44 |
| 3-7  | 0.50 | 2.00 | 1.25 | 0.30 | 0.200 | 0.100 | 1.00 | 1.00 | 1.60 |
| 3-8  | 0.50 | 0.60 | 1.25 | 0.00 | 0.200 | 0.100 | 1.00 | 1.00 | 0.48 |
| 3-9  | 0.50 | 0.60 | 1.25 | 0.15 | 0.200 | 0.100 | 1.00 | 1.00 | 0.48 |
| 3-10 | 0.50 | 0.60 | 1.25 | 0.50 | 0.200 | 0.100 | 1.00 | 1.00 | 0.48 |
| 3-11 | 0.50 | 0.60 | 1.25 | 1.50 | 0.200 | 0.100 | 1.00 | 1.00 | 0.48 |
| 3-12 | 0.50 | 0.60 | 1.25 | 2.00 | 0.200 | 0.100 | 1.00 | 1.00 | 0.48 |

| Sample | Characteristics of Proto-type MLCC Number of Domain Watt | Characteristics of Proto-type MLCC Dielectric Constant | Characteristics of Proto-type MLCC DF(%) | Characteristics of Proto-type MLCC RC(ΩF) | Characteristics of Proto-type MLCC TCC(%) (85° C.) | Characteristics of Proto-type MLCC High-Temperature Withstand Voltage (V/μm)* | Characteristics of Proto-type MLCC Sintering Temperature | Judgment of Characteristics Dielectric Constant ○: Good X: Poor | Judgment of Characteristics High-Temperature Withstand Voltage ○: Good X: Poor | Judgment of Characteristics Sintering Property ○: Good X: Poor |
|---|---|---|---|---|---|---|---|---|---|---|
| 3-1  | 0 | 3306 | 5.64 | 3125 | -8.1% | 60 | 1090 | X | ○ | ○ |
| 3-2  | 5 | 3955 | 5.90 | 3364 | -8.2% | 60 | 1090 | ○ | ○ | ○ |
| 3-3  | 6 | 4342 | 6.42 | 3458 | -8.8% | 65 | 1090 | ○ | ○ | ○ |
| 3-4  | 7 | 4505 | 6.50 | 3697 | -6.5% | 65 | 1090 | ○ | ○ | ○ |
| 3-5  | 5 | 4312 | 6.42 | 3285 | -7.7% | 65 | 1090 | ○ | ○ | ○ |
| 3-6  | 5 | 3725 | 5.84 | 2947 | -8.4% | 60 | 1090 | ○ | ○ | ○ |
| 3-7  | 0 | 3464 | 5.69 | 3145 | -8.7% | 55 | 1090 | X | ○ | ○ |
| 3-8  | 0 | 3340 | 5.65 | 2789 | -7.2% | 40 | 1100 | X | X | ○ |
| 3-9  | 5 | 4342 | 6.12 | 2856 | -9.5% | 60 | 1100 | ○ | ○ | ○ |
| 3-10 | 7 | 4522 | 6.58 | 2936 | -8.8% | 70 | 1100 | ○ | ○ | ○ |
| 3-11 | 5 | 3501 | 6.03 | 3001 | -7.6% | 60 | 1100 | ○ | ○ | ○ |
| 3-12 | 0 | 3345 | 5.74 | 3455 | -8.1% | 50 | 1100 | X | X | ○ |

Samples 3-1 to 3-7 of Table 3 illustrate Inventive Examples depending on a change in content of the second accessory ingredient BaCO₃ and a change in Ba/Si ratio, when the content of the first accessory ingredient Na₂CO₃ was 0.5 moles, the content of the third accessory ingredient SiO₂ was 1.25 moles, the content of a fourth accessory ingredient Dy₂O₃ was 0.3 moles, the contents of the fifth accessory ingredients MnO₂ and V₂O₅ were 0.2 moles and 0.1 moles, respectively, and the contents of the sixth accessory ingredients CaCO₃ and ZrO₂ were 1.0 mole and 1.0 mole respectively, per 100 moles of the main ingredient BaTiO₃. Samples 3-1 to 3-7 of Table 4 illustrate characteristics of prototype multilayer ceramic capacitors using the dielectric ceramic compositions of samples 3-1 to 3-7 of Table 3, respectively.

Referring to Tables 3 and 4, in cases in which the content of the second accessory ingredient containing Ba contained within a range of 0.2 to 1.80 moles per 100 moles of the main ingredient, the Ba/Si ratio was within a range of 0.16 to 1.44.

Therefore, in a case in which the Ba/Si ratio was less than 0.16 or more than 1.44, the dielectric constant was also decreased to be less than 3500.

When the multilayer ceramic capacitor according to the exemplary embodiment in the present disclosure contains the second accessory ingredient containing Ba in a content within a range of 0.2 to 1.80 moles per 100 moles of the main ingredient, or the Ba/Si ratio was within a range of 0.16 to 1.44, the dielectric constant of 3500 or more may be secured.

In this case, in a fine structure of the dielectric layer of the multilayer ceramic capacitor according to the exemplary embodiment in the present disclosure, five or more domain walls may be contained per crystal grain.

Figure 3:
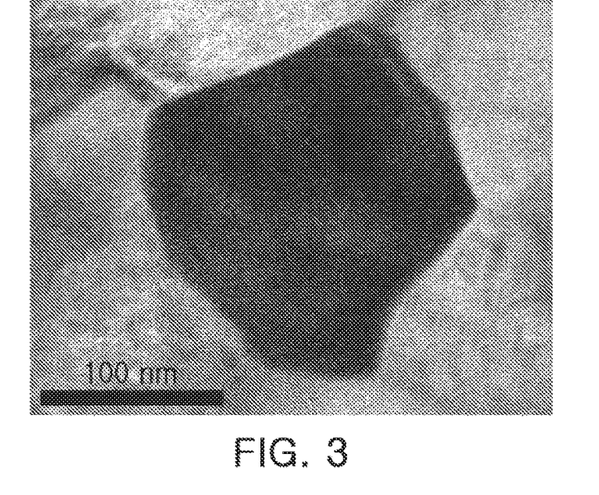
FIG. 3 is a photograph of a crystal grain of a dielectric layer of a multilayer ceramic capacitor in a Comparative Example.
Figure 4:
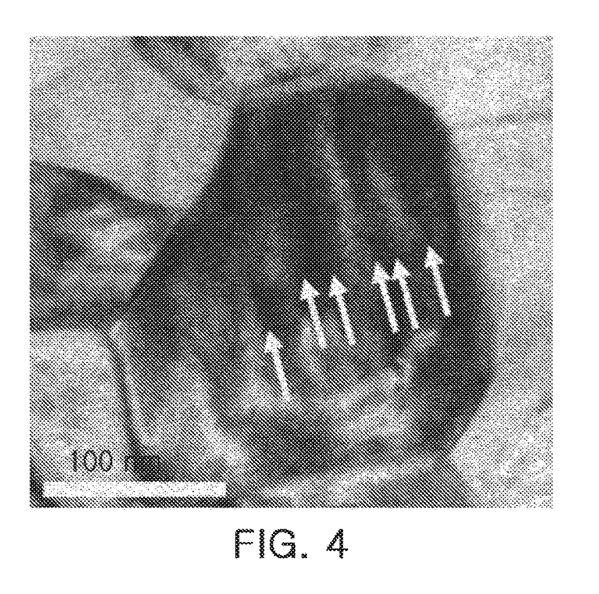
FIG. 4 is a photograph of a crystal grain of a dielectric layer of the multilayer ceramic capacitor according to an exemplary embodiment in the present disclosure, an arrow indicating a domain wall.

FIG. 3 is a photograph of a crystal grain of a dielectric layer of a multilayer ceramic capacitor of sample 3-1 (Comparative Example), and FIG. 4 is a photograph of a crystal grain of a dielectric layer of the multilayer ceramic capacitor of sample 3-3 according to the present disclosure, an arrow indicating a domain wall.

A fine structure of the dielectric layer was observed using a transmission electron microscope (TEM). As indicated by the arrow in FIG. 4, a parallel strip-shaped boundary exhibited in the crystal grain corresponds to the domain wall.

The average number of domain walls in a single sample was defined as the average number of domain walls of a crystal grain having the largest average number of domain walls among 20 crystal grains randomly selected.

In a ferroelectric material such as $BaTiO_3$, the dielectric constant $\epsilon_r$ may be determined by a dielectric constant ($\epsilon_r$[volume]) due to polarization caused by a change in position of Ti ions depending on an applied electric field and a dielectric constant ($\epsilon_r$[domain wall]) due to vibrations and switching of the domain wall, and this relationship may be represented by the following Equation 1.

$$\epsilon_r = \epsilon_r[\text{volume}] + \epsilon_r[\text{domain wall}] = \epsilon_r[\text{volume}] + \frac{Const.}{d} \quad [\text{Equation 1}]$$

Here, d indicates a thickness of a domain width.

Therefore, in order to implement a high dielectric constant at the same size of the crystal grain, there is a need to increase the average number of domain walls to decrease d.

Referring to FIGS. 3 and 4, it may be appreciated that the size of the crystal grain was about 150 nm.

Referring to FIG. 3, it may be appreciated that the domain wall was not observed in sample 3-1 (Comparative Example) In this case, the dielectric constant of the multilayer ceramic capacitor of Comparative Example was 3306, and it may be appreciated that the dielectric constant was less than 3500.

On the contrary, referring to FIG. 4, in sample 3-3, the crystal grain had a size similar to that in Comparative Example, but 6 domain walls were observed. In this case, the dielectric constant of the multilayer ceramic capacitor according to the exemplary embodiment in the present disclosure was 4342, and it may be appreciated that the dielectric constant was significantly higher than 3500, which was one of the desired characteristics.

That is, in a case in which the average number of domain walls per crystal grain of the dielectric layer is 5 or more, a dielectric constant of 3500 or more, one of the desired characteristics in the present disclosure, may be achieved.

Further, in the multilayer ceramic capacitor according to the exemplary embodiment in the present disclosure, even in a case in which the size of the crystal grain is about 250 nm or less, when the average number of domain walls per crystal grain is 5 or more, a dielectric constant of 3500 or more, one of the desired characteristics in the present disclosure, may be achieved.

Samples 3-8 to 3-12 of Table 3 illustrate Inventive Examples depending on a change in content of the fourth accessory ingredient $Dy_2O_3$, when the content of the first accessory ingredient $Na_2CO_3$ was 0.5 moles, the content of the second accessory ingredient $BaCO_3$ was 0.60 moles, the content of the third accessory ingredient $SiO_2$ was 1.25 moles, the contents of the fifth accessory ingredients $MnO_2$ and $V_2O_5$ were 0.2 moles and 0.1 moles, respectively, and the contents of the sixth accessory ingredients $CaCO_3$ and $ZrO_2$ were 1.0 mole and 1.0 mole respectively, per 100 moles of the main ingredient $BaTiO_3$. Samples 3-8 to 3-12 of Table 4 illustrate characteristics of prototype multilayer ceramic capacitors using Ni internal electrodes corresponding thereto, respectively, and sintered under the reduction atmosphere.

In a case (sample 3-8) in which the content of $Dy_2O_3$ was excessively low or a case (sample 3-12) in which the content of $Dy_2O_3$ was excessively high, a fine structure in which the average number of domain walls in a single crystal grain was less than 5 was formed, such that the dielectric constant was less than 3500. In cases (samples 3-9 to 3-11) in which the content of $Dy_2O_3$ was 0.15 to 1.50 moles per 100 moles of the main ingredient, when the fine structure in which the average number of domain walls in a single crystal grain was 5 or more was formed, all the desired characteristics in the present disclosure, that is, a dielectric constant of 3500 or more, a sintering temperature of 1100° C. or less, and a high-temperature withstand voltage of 50V/μm or more may be simultaneously implemented.

TABLE 5

Content (mole) of Each Additive per 100 Moles of Main Ingredient $BaTiO_3$

| Sample | 1st Accessory ingredient $Na_2CO_3$ | 2nd Accessory ingredient $BaCO_3$ | 3rd Accessory ingredient $SiO_2$ | 4th Accessory ingredient $Dy_2O_3$ | 5th Accessory ingredient $MnO_2$ | | 6th Accessory ingredient | | Ba/Si Ratio |
|---|---|---|---|---|---|---|---|---|---|
| | | | | | | $V_2O_5$ | Ca | Zr | |
| 5-1 | 0.50 | 0.60 | 1.25 | 0.30 | 0.000 | 0.000 | 1.00 | 1.00 | 0.48 |
| 5-2 | 0.50 | 0.60 | 1.25 | 0.30 | 0.050 | 0.025 | 1.00 | 1.00 | 0.48 |
| 5-3 | 0.50 | 0.60 | 1.25 | 0.30 | 1.000 | 0.500 | 1.00 | 1.00 | 0.48 |
| 5-4 | 0.50 | 0.60 | 1.25 | 0.30 | 1.500 | 0.750 | 1.00 | 1.00 | 0.48 |
| 5-5 | 0.50 | 0.60 | 1.25 | 0.30 | 0.200 | 0.100 | 0.00 | 0.00 | 0.48 |
| 5-6 | 0.50 | 0.60 | 1.25 | 0.30 | 0.200 | 0.100 | 10.00 | 10.00 | 0.48 |

TABLE 6

| | Characteristics of Proto-type MLCC | | | | | | Judgment of Characteristics | | |
|---|---|---|---|---|---|---|---|---|---|
| Sample | Dielectric Constant | DF(%) | RC(ΩF) | TCC(%) (85° C.) | High-Temperature Withstand Voltage (V/μm)* | Sintering Temperature (° C.) | High-Dielectric Constant ○: Good X: Poor | High-Temperature Withstand Voltage ○: Good X: Poor | Sintering Property ○: Good X: Poor |
| 5-1 | 8364 | 153.0 | — | — | 5 | 1100 | ○ | X | ○ |
| 5-2 | 4231 | 6.23 | 3287 | −8.3% | 55 | 1100 | ○ | ○ | ○ |
| 5-3 | 3645 | 4.56 | 4896 | −7.1% | 75 | 1100 | ○ | ○ | ○ |
| 5-4 | 2545 | 3.26 | 1562 | −7.1% | 65 | 1100 | X | ○ | ○ |
| 5-5 | 4248 | 5.97 | 3216 | −7.8% | 55 | 1100 | ○ | ○ | ○ |
| 5-6 | 3524 | 4.88 | 3687 | −8.1% | 60 | 1100 | ○ | ○ | ○ |

Samples 5-1 to 5-4 of Table 5 illustrate Inventive Examples depending on changes in contents of fifth accessory ingredients $MnO_2$ and $V_2O_5$, when the content of the first accessory ingredient $Na_2CO_3$ was 0.5 moles, the content of the second accessory ingredient $BaCO_3$ was 0.60 moles, the content of the third accessory ingredient $SiO_2$ was 1.25 moles, the content of the fourth accessory ingredient $Dy_2O_3$ was 0.3 moles, and the contents of the sixth accessory ingredients $CaCO_3$ and $ZrO_2$ were 1.0 mole and 1.0 mole respectively, per 100 moles of the main ingredient $BaTiO_3$. Samples 5-1 to 5-4 of Table 6 illustrate characteristics of prototype multilayer ceramic capacitors using Ni internal electrodes corresponding thereto, respectively, and sintered under the reduction atmosphere.

In a case (sample 5-1) in which the content of the fifth accessory ingredient was excessively low, high-temperature withstand voltage characteristics were deteriorated, and in a case (sample 5-4) in which the content of the fifth accessory ingredient was excessively high, the dielectric constant was less than 3500.

Therefore, in order to allow all the desired characteristics in the present disclosure to be simultaneously implemented, the fifth accessory ingredient may be contained so that the sum of the contents of the variable valence acceptor elements contained in the fifth accessory ingredient is 0.1 to 2.0 at % (samples 5-2 and 5-3).

Samples 5-5 and 5-6 of Table 5 illustrate samples corresponding to a case in which the contents of the sixth accessory ingredients were excessively low ($CaCO_3$:0 mole, $ZrO_2$:0 mole) and a case in which the contents of the sixth accessory ingredients were excessively high ($CaCO_3$:10 moles, $ZrO_2$:10 moles), when the content of the first accessory ingredient $Na_2CO_3$ was 0.5 moles, the content of the second accessory ingredient $BaCO_3$ was 0.60 moles, the content of the third accessory ingredient $SiO_2$ was 1.25 moles, the content of the fourth accessory ingredient $Dy_2O_3$ was 0.3 moles, and the contents of the fifth accessory ingredients $MnO_2$ and $V_2O_5$ were 0.2 moles and 0.1 moles respectively, per 100 moles of the main ingredient $BaTiO_3$. Samples 5-5 and 5-6 of Table 6 illustrate characteristics of prototype multilayer ceramic capacitors using Ni internal electrodes corresponding thereto, respectively, and sintered under the reduction atmosphere.

When the sixth accessory ingredient was added, the RC value was increased, but in sample 5-6 in which the content of the sixth accessory ingredient was slightly high, the dielectric constant was decreased to be about 3524. Therefore, the content of the sixth accessory ingredient at which all the desired characteristic in the present disclosure may be simultaneously implemented may be 10 moles or less per 100 moles of the base material.

TABLE 7

Content (mole) of Each Additive per 100 Moles of Main Ingredient $BaTiO_3$

| Sample | 1st Accessory ingredient $Na_2CO_3$ | 2nd Accessory ingredient $BaCO_3$ | 3rd Accessory ingredient $SiO_2$ | 4th Accessory ingredient $Dy_2O_3$ | 5th Accessory ingredient $MnO_2$ | 5th Accessory ingredient $V_2O_5$ | 6th Accessory ingredient Ca | 6th Accessory ingredient Zr | Ba/Si Ratio |
|---|---|---|---|---|---|---|---|---|---|
| 7-1 | 0.50 | 0.15 | 0.30 | 0.30 | 0.200 | 0.100 | 1.00 | 1.00 | 0.50 |
| 7-2 | 0.50 | 0.08 | 0.50 | 0.30 | 0.200 | 0.100 | 1.00 | 1.00 | 0.16 |
| 7-3 | 0.50 | 0.72 | 0.50 | 0.30 | 0.200 | 0.100 | 1.00 | 1.00 | 1.44 |
| 7-4 | 0.50 | 0.90 | 0.50 | 0.30 | 0.200 | 0.100 | 1.00 | 1.00 | 1.80 |
| 7-5 | 0.50 | 0.65 | 4.00 | 0.30 | 0.200 | 0.100 | 1.00 | 1.00 | 0.16 |
| 7-6 | 0.50 | 5.75 | 4.00 | 0.30 | 0.200 | 0.100 | 1.00 | 1.00 | 1.44 |
| 7-7 | 0.50 | 6.40 | 4.00 | 0.30 | 0.200 | 0.100 | 1.00 | 1.00 | 1.60 |
| 7-8 | 0.50 | 2.85 | 6.00 | 0.30 | 0.203 | 0.100 | 1.00 | 1.00 | 0.48 |

TABLE 8

| | Characteristics of Proto-type MLCC | | | | | | Judgment of Characteristics | | |
| --- | --- | --- | --- | --- | --- | --- | --- | --- | --- |
| Sample | Dielectric Constant | DF(%) | RC(ΩF) | TCC(%) (85° C.) | High-Temperature Withstand Voltage (V/μm)* | Sintering Temperature (° C.) | Dielectric Constant ○: Good X: Poor | High-Temperature Withstand Voltage ○: Good X: Poor | Sintering Property ○: Good X: Poor |
| 7-1 | 3625 | 5.23 | 1568 | −8.4% | 55 | 1130 | ○ | ○ | X |
| 7-2 | 3735 | 5.67 | 3325 | −8.4% | 65 | 1100 | ○ | ○ | ○ |
| 7-3 | 4057 | 6.45 | 3126 | −8.2% | 65 | 1100 | ○ | ○ | ○ |
| 7-4 | 3456 | 4.98 | 3233 | −8.0% | 65 | 1110 | X | ○ | X |
| 7-5 | 3912 | 5.23 | 3045 | −8.1% | 60 | 1080 | ○ | ○ | ○ |
| 7-6 | 4451 | 6.62 | 3175 | −8.3% | 60 | 1100 | ○ | ○ | ○ |
| 7-7 | 2545 | 4.63 | 3222 | −8.2% | 60 | 1140 | X | ○ | X |
| 7-8 | 4445 | 6.45 | 3126 | −8.2% | 45 | 1090 | ○ | X | ○ |

Samples 7-1 to 7-8 of Table 7 illustrate Inventive Examples depending on changes in contents of the second accessory ingredient $BaCO_3$ and the third accessory ingredient $SiO_2$ and changes in the Ba/Si ratio, when the content of the first accessory ingredient $Na_2CO_3$ was 0.5 moles, the content of the fourth accessory ingredient $Dy_2O_3$ was 0.3 moles, the contents of the fifth accessory ingredients $MnO_2$ and $V_2O_5$ were 0.2 moles and 0.1 moles, respectively, and the contents of the sixth accessory ingredients $CaCO_3$ and $ZrO_2$ were 1.0 mole and 1.0 mole respectively, per 100 moles of the main ingredient $BaTiO_3$. Samples 7-1 and 7-8 of Table 8 illustrate characteristics of prototype multilayer ceramic capacitors using Ni internal electrodes corresponding thereto, respectively, and sintered under the reduction atmosphere.

In a case (sample 7-1) in which the content of $SiO_2$ was excessively low, even though the Ba/Si ratio was in a range of 0.16 to 1.44, the sintering temperature may be 1100° C. or more.

Further, in a case (sample 7-8) in which the content of $SiO_2$ was excessively high (6 moles) per 100 moles of the main ingredient, the high-temperature withstand voltage was less than 50V/μm.

Therefore, when the Ba/Si ratio was in a range of 0.16 to 1.44 and the content of the sixth accessory ingredient $SiO_2$ was in a range of 0.5 to 4.0 at %, all the desired characteristics in the present disclosure may be simultaneously implemented.

Manufacturing Method of Multilayer Ceramic Capacitor

A manufacturing method of a multilayer ceramic capacitor according to another exemplary embodiment in the present disclosure may include: preparing ceramic green sheets using a dielectric ceramic composition; printing first and second internal electrodes on the ceramic green sheets, respectively; preparing a body by stacking, compressing, and cutting the ceramic green sheets on which the first and second internal electrodes are printed, respectively; and sintering the body.

In the manufacturing method of a multilayer ceramic capacitor according to the present exemplary embodiment in the present disclosure, as the dielectric ceramic composition, the dielectric ceramic composition according to the exemplary embodiment in the present disclosure described above may be used.

Here, the sintering of the body may be performed at a temperature of 1100° C. or less.

TABLE 9

| | Content (mole) of Each Additive per 100 Moles of Main Ingredient $BaTiO_3$ | | | | | | | | |
| --- | --- | --- | --- | --- | --- | --- | --- | --- | --- |
| | 1st Accessory ingredient | 2nd Accessory ingredient | 3rd Accessory ingredient | 4th Accessory ingredient | 5th Accessory ingredient | | 6th Accessory ingredient | | Ba/Si |
| Sample | $Na_2CO_3$ | $BaCO_3$ | $SiO_2$ | $Dy_2O_3$ | $MnO_2$ | $V_2O_5$ | Ca | Zr | Ratio |
| 9-1 | 0.200 | 0.100 | 0.50 | 0.60 | 0.30 | 1.00 | 1.00 | 1.25 | 0.48 |
| 9-2 | Re-oxidation of Sintered Chip of 9-1 ($N_2$ atmosphere, 1000° C. rapidly cooled after 2 hours, repeated 3 times) | | | | | | | | |
| 9-3 | Pressurization heat-treatment for Completed Chip of 9-2 (200° C., 10 MPa, cooled to room temperature after 30 m) | | | | | | | | |

TABLE 10

| | | Characteristics of Proto-type MLCC | | | | | | Judgment of Characteristics | | |
| --- | --- | --- | --- | --- | --- | --- | --- | --- | --- | --- |
| Sample | Number of Domain Watt | Dielectric Constant | DF(%) | RC(ΩF) | TCC(%) (85° C.) | High-Temperature Withstand Voltage (V/μm)* | Sintering Temperature | Dielectric Constant ○: Good X: Poor | High-Temperature Withstand Voltage ○: Good X: Poor | Sintering Property ○: Good X: Poor |
| 9-1 | 6 | 4342 | 6.42 | 3458 | −8.8% | 65 | 1090 | ○ | ○ | ○ |
| 9-2 | 8 | 4856 | 6.58 | 3568 | −9.0% | 65 | 1090 | ○ | ○ | ○ |

TABLE 10-continued

| | Characteristics of Proto-type MLCC | | | | | | Judgment of Characteristics | | |
|---|---|---|---|---|---|---|---|---|---|
| Sample | Number of Domain Watt | Dielectric Constant | DF(%) | RC(ΩF) | TCC(%) (85° C.) | High-Temperature Withstand Voltage (V/μm)* | Sintering Temperature | Dielectric Constant ○: Good X: Poor | High-Temperature Withstand Voltage ○: Good X: Poor | Sintering Property ○: Good X: Poor |
| 9-3 | 11 | 5523 | 6.89 | 3274 | −9.2% | 65 | 1090 | ○ | ○ | ○ |

Table 9 illustrates compositions before and after additional heat-treatment of sample 9-1 and conditions of the additional heat-treatment, and Table 10 illustrates characteristics of prototype multilayer ceramic capacitors corresponding to these Inventive Examples.

Referring to Tables 9 and 10, it may be confirmed that after repeating a process of performing re-oxidation heat-treatment on sample 9-1 at 1000° C. under a $N_2$ atmosphere for 2 hours and slowly or rapidly cooling sample 9-1 as in the case of Inventive Example 9-2 three times, the average number of domain walls per crystal grain was increased from 6 to 8, and the dielectric constant was increased from 4342 to 4856.

Figure 5:
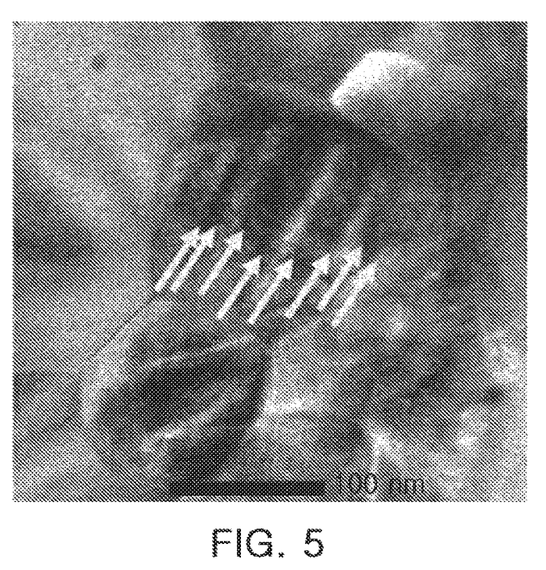
FIG. 5 is a photograph of the crystal grain of the dielectric layer after performing re-oxidation heat-treatment on the multilayer ceramic capacitor according to an exemplary embodiment in the present disclosure, an arrow indicating a domain wall.
Figure 6:
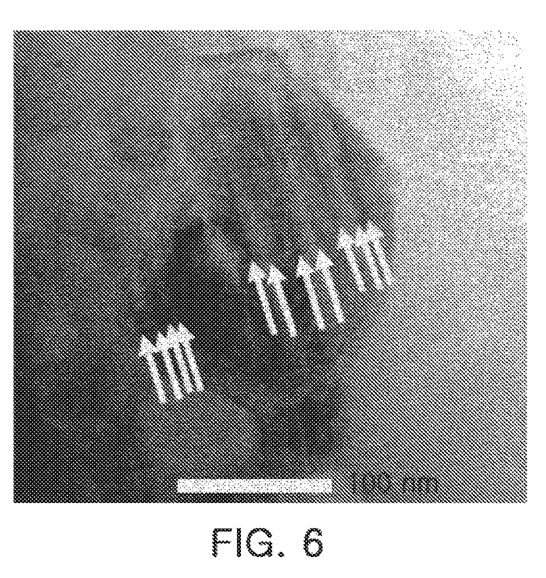
FIG. 6 is a photograph of the crystal grain of the dielectric layer after performing pressurization heat-treatment on the multilayer ceramic capacitor according to an exemplary embodiment in the present disclosure, an arrow indicating a domain wall.
Figure 7:
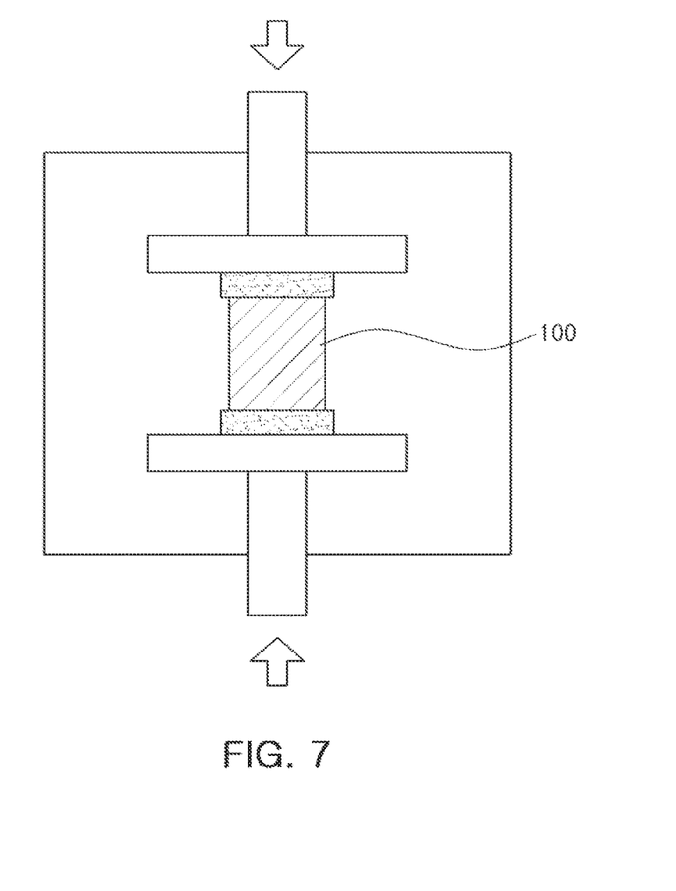
FIG. 7 is a schematic mimetic view illustrating pressurization heat-treatment of a multilayer ceramic capacitor according to an exemplary embodiment in the present disclosure.

Further, it may be appreciated that in a case (sample 9-3) of disposing the multilayer ceramic capacitor 100 in sample 9-2 in a pressurization heat-treatment apparatus of FIG. 7, additionally maintaining a pressure of 10 MPa at 200° C. for 30 minutes, cooling the sample to room temperature, and removing the multilayer ceramic capacitor from the pressurization heat-treatment apparatus, the average number of domain walls in a single crystal grain was further increased from 8 to 11 as illustrated in FIGS. 5 and 6, and the dielectric constant was also increased from 4856 to 5523.

Therefore, these results show that the average number of domain walls in a single crystal grain may be increased by suitable post heat-treatment conditions, and thus, the dielectric constant may also be increased.

That is, the manufacturing method of a multilayer ceramic capacitor according to another exemplary embodiment in the present disclosure may further include, after the sintering of the body, reoxidizing the body, thereby allowing the average number of domain walls per crystal grain of the dielectric layer to be 8 or more in the fine structure of the dielectric layer.

Further, the manufacturing method may further include, after the reoxidizing of the body, pressing the body at 100 to 200° C. and a pressure of 1 to 10 MPa; and cooling the pressed body to room temperature, thereby allowing the average number of domain walls per crystal grain of the dielectric layer to be 11 or more in the fine structure of the dielectric layer.

Overall, according to the exemplary embodiments in the present disclosure, it may be confirmed that when the fine structure in which the average number of domain walls in a single crystal grain is large is implemented, even though an average crystal grain size of the dielectric layer is 250 nm or less, a high dielectric constant may be obtained.

Further, it may be confirmed that in all the Inventive Examples satisfying the desired characteristics in the present disclosure, since TCC at 85° C. was less than ±15% under the measurement condition at which a high AC electric field of AC 0.5V/μm was applied, the X5R standard was satisfied.

As set forth above, according to the exemplary embodiment in the present disclosure, since the dielectric ceramic composition contains: the barium titanate-based powder as the main ingredient; the first accessory ingredient containing Na; the second accessory ingredient containing Ba; and the third accessory ingredient containing Si, the content of the first accessory ingredient (based on moles of Na) being 0.3 to 4.0 moles per 100 moles of the main ingredient, and the Ba/Si ratio in a range of 0.16 to 1.44, multiple desired characteristics of the multilayer ceramic capacitor in the present disclosure, that is, a sintering temperature of 1100° C. or less, a dielectric constant of 3500 or more, and a high-temperature withstand voltage of 50V/μm or more, may be simultaneously implemented.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising:
   a barium titanate-based powder as a main ingredient;
   a first accessory ingredient containing sodium (Na);
   a second accessory ingredient containing barium (Ba); and
   a third accessory ingredient containing silicon (Si),
   wherein a content of the first accessory ingredient (based on moles of Na) is within a range of 0.3 to 4.0 moles per 100 moles of the main ingredient,
   a ratio of Ba in the second accessory ingredient to Si in the third accessory ingredient is within a range of 0.16 to 1.44, and
   the first accessory ingredient is $Na_2O$ or $Na_2CO_3$.

2. The dielectric ceramic composition of claim 1, wherein the second accessory ingredient is one or more selected from the group consisting of oxides and carbonates of Ba, and a content of the second accessory ingredient is within a range of 0.2 to 1.80 moles per 100 moles of the main ingredient.

3. The dielectric ceramic composition of claim 1, wherein the third accessory ingredient is one or more selected from the group consisting of oxides and carbonates of Si and glass containing Si, and a content of the third accessory ingredient is within a range of 0.5 to 4.0 moles per 100 moles of the main ingredient.

4. The dielectric ceramic composition of claim 1, further comprising a fourth accessory ingredient being one or more selected from the group consisting of oxides or carbonates of rare earth elements including yttrium (Y), dysprosium (Dy), holmium (Ho), lanthanum (La), cerium (Ce), neodymium (Nd), samarium (Sm), gadolinium (Gd), or erbium (Er),
   wherein a content of the fourth accessory ingredient is within a range of 0.15 to 1.50 moles per 100 moles of the main ingredient.

5. The dielectric ceramic composition of claim 1, further comprising a fifth accessory ingredient being one or more selected from the group consisting of oxides or carbonates of variable valence acceptor elements including manganese (Mn), vanadium (V), chromium (Cr), iron (Fe), nickel (Ni), cobalt (Co), copper (Cu), or zinc (Zn), wherein a content of the fifth accessory ingredient (based on a sum of contents of the variable valence elements) is within a range of 0.1 to 2.0 moles per 100 moles of the main ingredient.

6. The dielectric ceramic composition of claim 1, further comprising a sixth accessory ingredient including Ca or Zr, wherein a content of the sixth accessory ingredient is within a range of more than 0 to 10 moles or less per 100 moles of the main ingredient.

7. A multilayer ceramic capacitor comprising:

a body in which dielectric layers are stacked; and first and second internal electrodes alternately disposed with respective dielectric layers interposed therebetween, wherein the dielectric layer contains the dielectric ceramic composition of claim 1.

8. The multilayer ceramic capacitor of claim 7, wherein in a fine structure of the dielectric layer, an average number of domain walls per crystal grain of the dielectric layer is 5 or more.

9. The multilayer ceramic capacitor of claim 7, wherein in a fine structure of the dielectric layer, an average number of domain walls per crystal grain of the dielectric layer is 8 or more.

10. The multilayer ceramic capacitor of claim 7, wherein in a fine structure of the dielectric layer, an average number of domain walls per crystal grain of the dielectric layer is 11 or more.

11. The multilayer ceramic capacitor of claim 7, wherein an average crystal grain size of the dielectric layer is 250 nm or less.

* * * * *